US008881852B2

(12) United States Patent
Kim

(10) Patent No.: US 8,881,852 B2
(45) Date of Patent: Nov. 11, 2014

(54) PUSHABLE FRAME WITH GENERATORS THAT CONVERT KINETIC ENERGY INTO ELECTRIC ENERGY

(75) Inventor: Seong-yoon Kim, Daegu (KR)

(73) Assignee: Woosung Tech. Co., Ltd., Gyeongsangbuk-Do (KR)

( * ) Notice: Subject to any disclaimer, the term of this patent is extended or adjusted under 35 U.S.C. 154(b) by 0 days.

(21) Appl. No.: 13/380,887

(22) PCT Filed: Sep. 20, 2010

(86) PCT No.: PCT/KR2010/006487
§ 371 (c)(1), (2), (4) Date: Dec. 26, 2011

(87) PCT Pub. No.: WO2011/037399
PCT Pub. Date: Mar. 31, 2011

(65) Prior Publication Data

US 2012/0187661 A1 Jul. 26, 2012

(30) Foreign Application Priority Data

Sep. 22, 2009 (KR) ........................ 10-2009-0089352

(51) Int. Cl.
*B62B 3/02* (2006.01)
*A61H 3/04* (2006.01)

(52) U.S. Cl.
CPC .......... *A61H 3/04* (2013.01); *A61H 2201/0188* (2013.01); *A61H 2201/5097* (2013.01); *A61H 2201/5079* (2013.01)
USPC ....................................... 180/65.1; 180/65.31

(58) Field of Classification Search
CPC .................... A61H 2003/04; A61H 2003/043; A61H 2003/046; A61G 2005/048
USPC .......... 180/65.1, 65.51, 907, 6.48, 6.5, 65.31; 297/DIG. 4; 135/67; 280/29, 200
See application file for complete search history.

(56) References Cited

U.S. PATENT DOCUMENTS

| | | | | |
|---|---|---|---|---|
| 3,872,945 A * | 3/1975 | Hickman et al. | ............. | 180/65.6 |
| 5,803,103 A * | 9/1998 | Haruyama | ...................... | 135/67 |
| 6,378,883 B1 * | 4/2002 | Epstein | ...................... | 280/250.1 |
| 6,394,205 B1 * | 5/2002 | Akuzawa | ...................... | 180/19.3 |
| 6,536,544 B1 * | 3/2003 | Egawa et al. | ................ | 180/19.3 |
| 6,571,896 B2 * | 6/2003 | Roberts | ........................ | 180/65.1 |
| 6,807,465 B2 * | 10/2004 | Ulrich et al. | ...................... | 701/1 |
| 7,441,633 B2 * | 10/2008 | Kim | ................................ | 188/78 |
| 7,562,883 B2 * | 7/2009 | Livengood et al. | ........ | 280/87.01 |

(Continued)

FOREIGN PATENT DOCUMENTS

| | | |
|---|---|---|
| KR | 2001-0019654 | 3/2001 |
| KR | 2004-0066943 | 7/2004 |
| KR | 10-0902252 | 6/2009 |
| KR | 10-0912404 | 8/2009 |

*Primary Examiner* — John Walters
*Assistant Examiner* — Brian Swenson
(74) *Attorney, Agent, or Firm* — Leason Ellis LLP.

(57) ABSTRACT

A pushable frame includes a plurality of wheels to allow maneuvering due to a rolling motion of one or more wheels. A power generator is operatively connected to the wheels such that kinetic motion of the wheels caused by the frame being pushed or pulled by the user is converted into electric energy. A speed regulator is operatively connected with the plurality of wheels and the power generator such that a rolling speed of one or more wheels is controlled based on a rolling condition of the one or more wheels.

4 Claims, 2 Drawing Sheets

(56) References Cited

U.S. PATENT DOCUMENTS 7,708,120 B2 * 5/2010 Einbinder ........................ 188/31
7,793,950 B2 * 9/2010 Van Eeden ............... 280/87.041
2003/0018417 A1 * 1/2003 Ulrich et al. ...................... 701/1
2006/0163829 A1 * 7/2006 Livengood et al. ...... 280/87.021
2006/0249320 A1 * 11/2006 Carter et al. ................. 180/65.5

* cited by examiner

PUSHABLE FRAME WITH GENERATORS THAT CONVERT KINETIC ENERGY INTO ELECTRIC ENERGY

TECHNICAL FIELD

This disclosure relates to a pushable frame with generators that convert kinetic energy into electric energy.

BACKGROUND ART

A so-called walker (i.e. a walking support device) can be used by patients, the elderly, physically handicapped persons, or others who require or desire additional support for maintaining balance or stability while walking.

Various types of walkers are commercially available. A typical walker includes a frame of curved metal pipes, a plurality of wheels disposed at a lower end of the frame, and a pair of handles that allow the user to grasp the frame and push or pull the walker in various directions.

However, such related art walkers may undesirably roll too fast or accelerate in certain situations, such as when being pushed downhill by the user. Such situations could also occur even when the walker is pushed or pulled along a level surface. Additionally, when being pushed uphill, the walker may be prone to rolling backwards undesirably toward the user.

DISCLOSURE OF INVENTION

Solution to Problem

A pushable frame includes a plurality of wheels and one or more generators operatively attached thereto. The generators convert the kinetic energy due to the movement of the pushable frame into potential energy (i.e. electric energy), which is stored in a rechargeable battery attached to the pushable frame. Such battery is used to power various electronic devices, such as a brake mechanism for the wheels, a wireless communication means, and illumination means, and other relatively low powered electronics.

MODE FOR THE INVENTION

Figure 1:
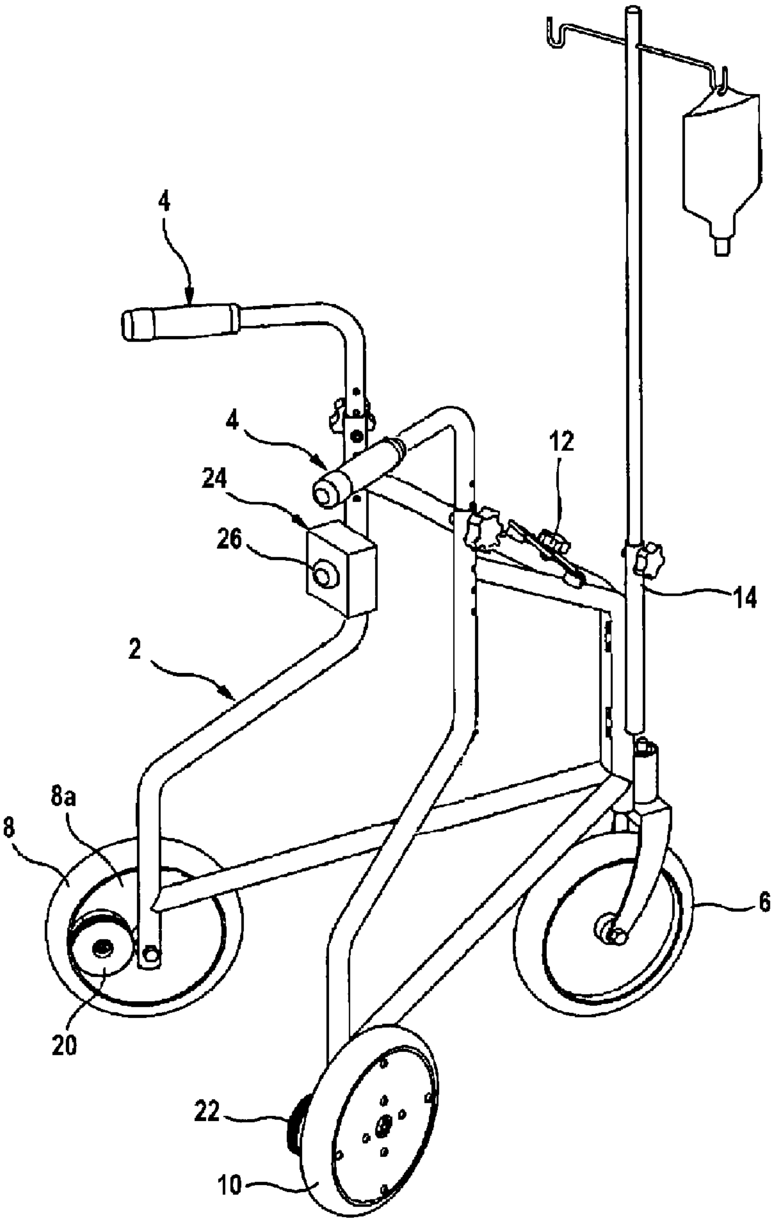
FIG. 1 shows an exemplary embodiment of a pushable frame in accordance with the present description.

Reference will now be made in detail to some embodiments of the present description, examples of which are illustrated in the accompanying drawings. It will also be apparent to those skilled in the art that various modifications and variations can be made. Thus, it is intended that the present description cover modifications and variations of the concepts described herein provided that they come within the scope of the appended claims and their equivalents.

The present inventor recognized at least the following issues related to walkers and other devices having a frame with wheels that can be pushed or pulled or otherwise moved by the user. Some non-limiting examples of a pushable frame include a walking assistance device, a support device, a walker, a stroller, a cart, a carriage, and the like.

To address certain problems in the related art, some related art walkers have a brake mechanism (using dampers or similar mechanical elements) installed at the wheels and connected to a brake lever placed at the handles, which allow the user to apply the brakes when desired. However, walkers are typically used by patients, the elderly or others who require assistance when they walk. As such, proper grasping of the brake lever may not always be possible for such users. Consequently, brakes that require the user to exert a relatively large amount of physical force may not be practical.

To address such problems, Korean Patent No. 10-0768644 (Oct. 12, 2007; Apparatus for Automatic Brake of Walking Support Machine) discloses a mechanical brake, which is not based on manual operation, but operates automatically when a travel speed is detected to be above a preset value. However, the configuration of this device requires numerous components and manufacturing procedures, which may result in higher than expected fabrication costs. Also, the numerous mechanical components may be prone to wear and tear after extended use.

In this regard, Korean Patent No. 10-0902252 (Jun. 3, 2009; Apparatus for Brake of Walking Support Machine) provides an electronic brake with a more simple structure. An electric generator is employed for the brake mechanism, but too much heat may be generated due to braking resistance after prolonged use.

Also, because patients or people with medical issues may use such walkers, the user could be faced with situations that require further personal assistance. However, the related art walkers do not include any means to contact or communicate with others. An electronic device used for communication could be attached, but the issue of being able to supply adequate power thereto needs to be resolved. A replaceable battery could be connected to such electronic device. However, not being able to know when the battery needs replacement, having to manually replace the battery, and the like, causes inconvenience to the user.

Based upon such recognition, the present inventor conceived the following features for a pushable frame.

The pushable frame or apparatus has a frame and a plurality of wheels attached to the frame to allow the frame to be maneuvered due to a rolling motion of one or more wheels. A power generator is operatively connected to the wheels such that kinetic motion of the wheels caused by the frame being pushed or pulled by the user is converted into electric energy. Also, a speed regulator is operatively connected with the plurality of wheels and the power generator such that a rolling speed of one or more wheels is controlled based on a rolling condition of the one or more wheels.

The speed regulator controls the rolling speed of the one or more wheels by increasing or decreasing at least one of resistance and power being applied on the one or more wheels. The speed regulator may control the rolling speed of a pair of rear wheels among the plurality of wheels.

The rolling condition of the one or more wheels depends on a degree of incline or amount of irregularities along a surface on which the frame is being maneuvered by the user.

The frame may have a seating means attached to the frame that allows the user or person to be seated or positioned thereon or allows items to be placed thereon. Also, the frame may have a folding mechanism or collapsible means that permits the user to fold or collapse the frame to allow for portability or storage. The frame is allowed to be maneuvered upon being pushed, pulled, turned, pivoted, or otherwise moved by the user.

The frame may also have one or more electronic devices attached to the frame and powered by the generators. The electronic devices denote one or more devices among a group comprising a wireless communication means, an illumination means, a display monitor, a display screen, a heating means (such as a heater), a cooling means (such as a fan), and a healthcare related device (such as a heartbeat sensor, body composition sensors, bio-monitoring sensors, etc.)

Additionally, the frame may have a rechargeable power source operatively connected to the power generator so as to be recharged by the electric energy from the power generator. One or more electronic devices may be attached to the frame and powered by the rechargeable power source.

FIG. 1 shows an exemplary embodiment of a pushable frame in accordance with the present description.

The pushable frame may include a frame 2 (or other body) made of rigid material (such as metal), one or more handles 4 (or other graspable element) at an upper portion of the frame 2, one or more front wheels 6 (or other rollable element) disposed on a lower end at the front of the frame 2, and a plurality of rear wheels 8 and 10 (or other rollable element) disposed at the left and right lower ends at the rear of the frame 2. The frame 2 may have a folding mechanism 12 (or other collapsible means) that permits the user to fold or collapse the frame 2 to allow for portability or storage. Additionally, a holding bar 14 (or other carrying means) may be provided or formed at some portion of the frame 2 to allow the user to hang or attach various items. In addition, the frame 2 may also have a seat (or other supporting means) on which the user or other person can sit, or on which items can be placed.

Each of the rear wheels 8 and 10 may be rotatably installed at a fixed plate 8*a* (or other fixture) that is attached onto the frame 2. The shafts of the rear wheels 8 and 10 may be operatively connected with a respective shaft for each of the generators 20 and 22 (or other means for creating energy or power) via a gear mechanism, a connection means, or the like. A control box 24 (or other storage location) for accommodating the necessary circuits and components, such as a mechanism used for controlling a rolling speed of the wheels (such as suppressing acceleration) and for charging a power supply, may be provided at a portion of the frame 2. A knob 26 (or other access means) may be located on a front surface of the control box 24. The circuits and components for suppressing acceleration and charging a power supply are electrically connected to the generators 20 and 22. In addition, an illumination means 28 and 30 (in FIG. 2) may be attached onto the frame 2 to accommodate the user's convenience or allow people and vehicles nearby to see the user and the frame 2.

Figure 2:
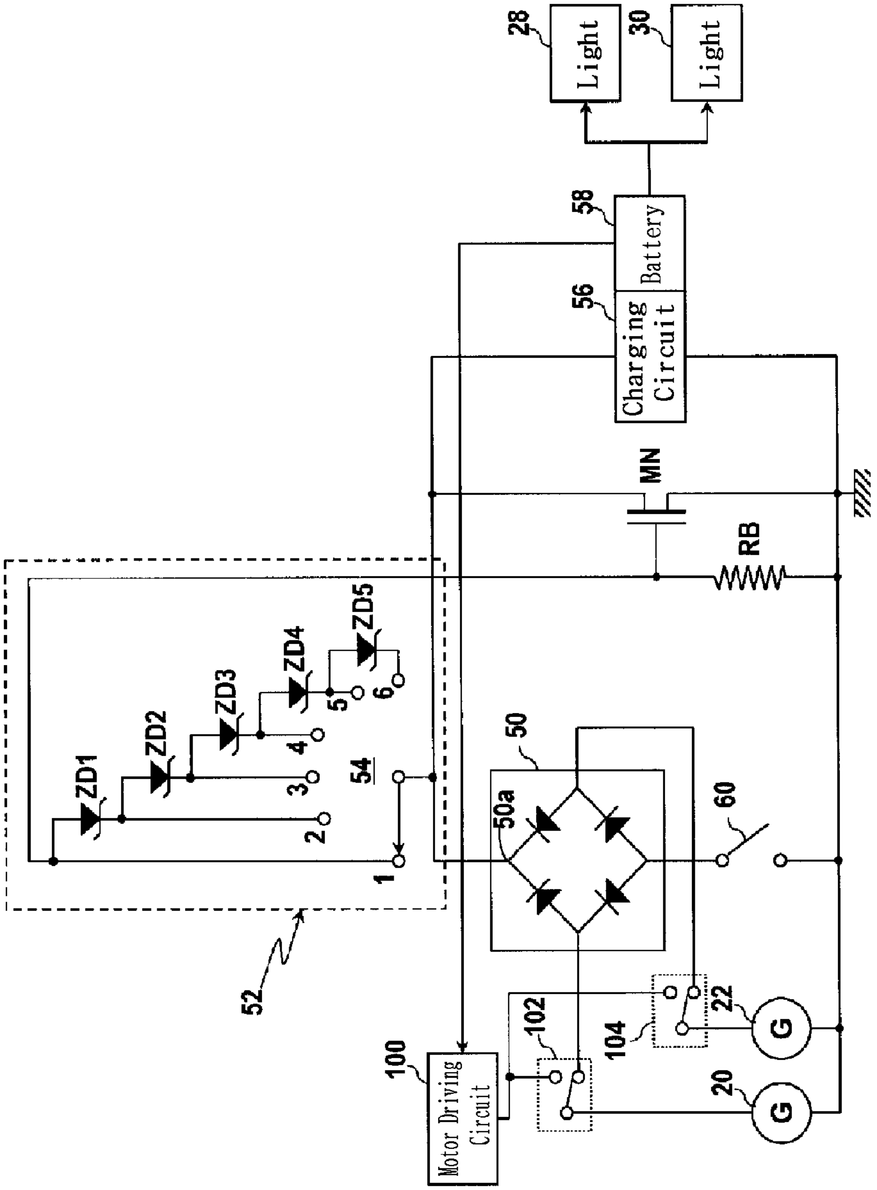
FIG. 2 shows an exemplary embodiment of a circuit for suppressing acceleration and charging electricity in accordance with the present description.

FIG. 2 shows an exemplary embodiment of a circuit or electronic scheme used for suppressing acceleration and charging a power source in accordance with the present description. Such circuit may include first and second generators 20 and 22, a bridge diode 50 (or other type of isolation circuit), a voltage drop circuit 52, a bias resistance RB, a transistor MN, a charging circuit 56 and a deactivation switch 60. FIG. 2 additionally shows an illumination means 28 and 30, a motor driving circuit 100 and switches 102 and 104.

The first generator 20 may be connected to a rotation shaft of the left rear wheel 8 via subordinate gears (or other mechanism), thereby generating an induced electromotive force in response to rotation of the left rear wheel 8 as a result of the frame 2 being pushed or pulled by the user. Similarly, the second generator 22 may be connected to a rotation shaft of the right rear wheel 10 via subordinate gears (or other mechanism), thereby generating an induced electromotive force in response to rotation of the right rear wheel 10. The subordinate gears may have a gear ratio of 1:10 to 1:20. Accordingly, even if the rear wheels 8 and 10 only rotate at a relatively small amount, the subordinate gears can sufficiently rotate the rotors of the first and second generators 20 and 22, thereby enabling the generation of electricity. In a certain embodiment, the first and second generators 20 and 22 may be implemented as direct current (DC) generators, but other implementations are clearly possible.

The isolation circuit 50 allows the power (i.e. electricity) generated by the first and second generators 20 and to be delivered to a drain of the transistor MN and the charging circuit 56, and simultaneously can prevent (or minimize) the charged power of a rechargeable battery 58 from being leaked towards the generators 20 and 22 via the charging circuit 56. In addition, the isolation circuit 50 may prevent (or minimize) the power generated by the first generator 20 from being introduced into the second generator 22, or the power generated by the second generator 22 from being introduced into the first generator 20.

The voltage drop circuit 52 may dictate the gate bias voltage of the transistor MN together with the bias resistance RB, and can be used to adjust the gate bias voltage so as to vary a field resistance and a current value of the transistor MN. In accordance with this particular embodiment, the voltage drop circuit 52 may include a rotary switch 54 and first to fifth Zener diodes ZD1 to ZD5. The rotary switch 54 may be provided with an input node and six output nodes, whereby the input node is selectively connected to one of the six output nodes in response to the rotation of the knob 26 disposed on the control box 24. The first output node of the rotary switch 54 may be connected directly to a gate of the transistor MN. The second output node of the rotary switch 54 may be connected to an anode terminal of the Zener diode ZD1 and a cathode terminal of the Zener diode ZD1 may be connected to the gate of the transistor MN. The third output node of the rotary switch 54 may be connected to an anode terminal of the Zener diode ZD2 and a cathode terminal of the Zener diode ZD2 may be connected to the anode terminal of the Zener diode ZD1. The fourth output node of the rotary switch 54 may be connected to an anode terminal of the Zener diode ZD3 and a cathode terminal of the Zener diode ZD3 may be connected to the anode terminal of the Zener diode ZD2. The fifth output node of the rotary switch 54 may be connected to an anode terminal of the Zener diode ZD4 and a cathode terminal of the Zener diode ZD4 may be connected to the anode terminal of the Zener diode ZD3. The sixth output node of the rotary switch 54 may be connected to an anode terminal of the Zener diode ZD5 and a cathode terminal of the Zener diode ZD5 may be connected to the anode terminal of the Zener diode ZD4. Accordingly, an output voltage of the isolation circuit 50 may be applied to the gate of the transistor MN via the different number of Zener diodes depending on a switching position of the rotary switch 54.

In one embodiment, the transistor MN may be implemented as an N-channel MOSFET. The drain of the transistor MN may be connected to an output terminal of the isolation circuit 50, and a source thereof may be grounded.

The charging circuit 56 may charge the rechargeable battery 58 via an input terminal thereof being connected to an output terminal 50*a* of the isolation circuit 50. The charging circuit 56 may be provided with a charging protection circuit. The illumination means 28 and 30 may operate by the power of the rechargeable battery 58, and may flicker (or exhibit other flashing characteristics) at a preset time period, such that people or vehicles around the nearby can become aware of the user of the pushable frame.

Also, the deactivation switch 60 for preventing reverse movement (i.e., a reverse movement preventing deactivation switch), which may be disposed between the isolation circuit 50 and ground, can be used to selectively deactivate an electronic acceleration suppressing function upon reverse movement. That is, when the switch 60 is in a closed (or short-circuit) state, an electronic acceleration suppressing function is activated such that a relatively large resistance is applied to the rotation of the rear wheels 8 and 10. However, when the switch 60 is in an opened state, the electronic acceleration suppressing function may not operate, and thus, the rear wheels 8 and 10 can rotate with minimum resistance.

The motor driving circuit 100 and the switches 102 and 104 may allow the generators 20 and 22 to operate as motors based upon the power supplied from the rechargeable battery 58. The switches 102 and 104 may make the output terminals of the generators 20 and 22 connected to the input terminal of the isolation circuit 50 in a normal state, while they allow the motor driving circuit 100 to be connected to the generators 20 and 22 in response to user switch manipulation, such as when the user walks along an uphill road with the pushable frame. Consequently, when the pushable frame is used on an uphill road, the generators 20 and 22 may operate as motors in response to user selection, thereby facilitating the movement of the pushable frame by supplying power to the rear wheels 10 and 20 based upon the energy charged in the rechargeable battery 58. The two switches 102 and 104 may be configured to be actuated by the same physical switch.

FIG. 2 also shows the illumination means 28 and 30 as being electric devices that can operate on the power supplied by the battery 58, with the generators 20 and 22 that can serve as motors.

In accordance with another embodiment, a wireless communication device can also be employed to call a guardian or an emergency rescue facility. Such wireless communication device may require extremely low power and employ short-range communication techniques (such as Bluetooth™), telecommunication techniques (such as CDMA) or other wireless or radio communications.

The operation of the circuit for suppressing acceleration and charging electrical power, shown in FIG. 2, will be described hereafter.

When the rear wheels 8 and 10 are rolled in a forward direction as the pushable frame is pushed by the user, the power being generated by the generators 20 and 22 is lowered to a level of the voltage at both ends of one diode in the isolation circuit 50, and then applied to the drain of the transistor MN. Also, the voltage lowered by the isolation circuit 50 is applied to the gate of the transistor MN via the voltage drop circuit 52. Here, the voltage lowered by the voltage drop circuit 52 may depend on the switching position of the rotary switch 54 connected to the voltage drop circuit 52, which will now be further described in more detail.

When the input node of the rotary switch 54 is connected to the first output node, no voltage drop may not occur in the voltage drop circuit 52, and accordingly, the output voltage of the isolation circuit 52 is applied to the gate of the transistor MN as it is. Assuming that the output of each generator 20 and 22 is constant, the gate voltage of the transistor MN becomes its highest state. The transistor MN is then sufficiently turned on to maintain a state in which a channel resistance is the lowest, and thus a large current can flow via the transistor MN. Consequently, the loads of the generators 20 and 22 may be increased, and similarly, the rear wheels 8 and 10 of the pushable frame may be rotated with torque that is responsive to the force that the user employs to push the pushable frame. Thus, the user may feel some resistance or stiffness as he pushes the pushable frame.

When the input node of the rotary switch 54 is connected to the second output node in response to the rotation of the knob 26 at the control box 24, the voltage is lowered to a level of the breakdown voltage for the Zener diode ZD1 by means of the voltage drop circuit 52. Accordingly, the voltage that was lowered from the output voltage of the isolation circuit 50 down to a level of the breakdown voltage for the Zener diode ZD1, is applied to the gate of the transistor MN. Assuming that the output of each generator 20 and 22 is constant, the gate voltage of the transistor MN is lowered by an amount that equals to the breakdown voltage for the Zener diode ZD1, as compared to that at a first switching position. Thus, the channel resistance of the transistor MN is slightly increased and the current flowing via the transistor MN is slightly decreased. Consequently, the loads of the generators 20 and 22 are slightly decreased, and the resistance decrease experienced by the generators 20 and 22 is transferred to the rear wheels 8 and 10 of the pushable frame, thereby reducing the stiffness felt by the user when pushing the pushable frame.

When the input node of the rotary switch 54 is connected to the third output node, the voltage may be lowered to the level of the breakdown voltage for two Zener diodes (i.e., ZD1 and ZD2) in the voltage drop circuit. Accordingly, the voltage that is lowered from the output voltage of the isolation circuit 50 down to the level of the breakdown voltage for the two Zener diodes ZD1 and ZD2, is applied to the gate of the transistor MN. Assuming that the output of each generator 20 and 22 is constant, the gate voltage of the transistor MN is lowered by the breakdown voltage of the two Zener diodes ZD1 and ZD2, as compared to that of the first switching position, so the channel resistance of the transistor MN is further increased and the current flowing via the transistor MN is further decreased. Consequently, the loads of the generators 20 and 22 are further decreased, and the additional resistance decrease experienced by the generators 20 and 22 is transferred to the rear wheels 8 and 10 of the pushable frame. As a result, the stiffness felt by the user when pushing the pushable frame can be further reduced.

In the above-described manner, when the input node of the rotary switch 54 is connected to each of the third, fourth, fifth and sixth output nodes, the resistance felt by the user is further decreased sequentially. For instance, when the input node of the rotary switch 54 is connected to the sixth output node, the voltage is lowered to a level of the breakdown voltage for five Zener diodes ZD1 to ZD5 in the voltage drop circuit 52. Accordingly, the voltage that is lowered from the output voltage of the isolation circuit 50 down to the breakdown voltage of the five Zener diodes ZD1 to ZD5, is applied to the gate of the transistor MN. Assuming that the output of each generator 20 and 22 is constant, the gate voltage of the transistor MN is further lowered by the breakdown voltage of the five Zener diodes ZD1 to ZD5 as compared to that at first switching position, so the channel resistance of the transistor MN is increased to the utmost level and the current flowing via the transistor MN is greatly decreased. Consequently, the loads of the generators 20 and 22 are minimized, and the resistance decrease experienced by the generators 20 and 22 is transferred to the rear wheels 8 and 10 of the pushable frame. As a result, the stiffness felt by the user when pushing the pushable frame is minimal.

As such, the circuit for suppressing acceleration and charging electricity, shown in FIG. 2, may operate to suppress acceleration of the pushable frame by virtue of an appropriate resistance generated according to the user's desires. Thus, the speed at which the pushable frame can move along an uphill or downhill road can be controlled by the user. During this process, the kinetic motion energy of the pushable frame is converted into electric energy by the generators 20 and 22, and part of the electric energy is converted into heat energy by the transistor MN and the bias resistance RB so as to be dispersed. For an effective discharge of the heat energy, the transistor MN may be thermally connected to the control box 24 so as to allow heat radiation via the external surfaces of the control box 24.

Hereafter, various situations related to the wheels and movement of the pushable frame will be explained.

When the reverse movement preventing deactivation circuit 60 deactivated (i.e. is in a short-circuit state), if the pushable frame is pulled back towards the user such that the rear wheels 8 and 10 roll in a backward direction, the current generated by the generators 20 and 22 flows to the isolation circuit 50 via the switch 60. Consequently, a load becomes large, which results in a large resistance being applied to the rear wheels 8 and 10, and thus the rear wheels 8 and 10 will roll more slowly. On the other hand, when the reverse movement preventing deactivation circuit 60 is activated (i.e. in an opened state), the short-circuit condition is removed. Accordingly, the load becomes small, which results in less resistance being applied to the rear wheels 8 and 10, and thus the pushable frame can be more easily moved in the reverse direction.

When the reverse movement preventing deactivation circuit 60 is deactivated, the situations where the pushable frame is turned towards the right-hand direction or pivoted on the right wheel 10 can be considered. Here, the left wheel 8 will rotate in the forward direction while the right wheel 10 will rotate in the reverse direction. Namely, due to the user's manipulation of the pushable frame, a large load (or weight) may be applied onto the right wheel 10 that causes it to roll slowly in the reverse direction, while the left wheel 8 will roll at a higher speed in the forward direction. This allows the user to more easily turn or pivot the pushable frame.

When the pushable frame is used while walking up an uphill road or incline, the switch 102 may connect the motor driving circuit 100 to the generator 20 and the switch 104 may connect the motor driving circuit 100 to the generator 22. In this state, the generators 20 and 22 operate as DC motors to power the rear wheels 8 and 10 using the energy previously charged in the battery 58, and thus assists the user who pushes the pushable frame on the incline.

It can be understood that the electric energy from the generators 20 and 22 can be converted into chemical energy for charging the battery 58. Such battery 58 may also be used to power other small devices such as the illumination means 28 and 30. Also, the battery 58 may supply sufficient power to operate a wireless communication device. Furthermore, the battery 58 may supply sufficient power to a small display monitor, a TV, a fan, or the like, which may also be attached to the pushable frame.

The various features described herein can also be summarized as follows:

A walking frame comprising: a frame; a plurality of wheels disposed at a lower end of the frame; a plurality of generators installed for each respective wheel via subordinate gears and configured to output alternating current (AC) power; a bias circuit electrically connected to each generator and configured to output a voltage at one of a plurality of preset levels according to user selection thereof; a transistor configured to operate by an output voltage of each generator and having a gate connected to an output terminal of the bias circuit; and a charging circuit electrically connected to each generator and configured to charge a rechargeable battery based upon the output voltage of the generator.

The wheels may be comprised of first and second wheels disposed at right and left sides of a lower end of the frame, wherein the generators comprise first and second generators installed in correspondence with the first and second wheels. The wheels are provided in plurality, and wherein the electric device comprises: a motor installed at one or more of the plurality of wheels; and a motor driving circuit configured to apply a driving current based upon a charged voltage of the rechargeable battery to the motor.

The generator may be a direct current (DC) generator, wherein a driving current based upon a charged voltage of the rechargeable battery is supplied to the DC generator to make the DC generator operate as a motor.

The walking frame may also have an isolation circuit configured to electrically isolate the output terminals of the first and second generators. The walking frame may also have an electric device configured to operate by power applied from the rechargeable battery. The electric device may refer to one or more devices among a group of devices comprising an illumination device, a wireless communication device, a broadcast signal receiver, and a fan. The wireless communication device communicates with an external device via wireless access protocols comprising one or more among Bluetooth™ and Code Division Multiple Access (CDMA).

The various concepts and features described in the present disclosure may be modified and embodied in different detailed forms without departing from the technical scope or characteristics thereof. For instance, the foregoing description includes exemplary embodiments employing DC generators. However, other embodiments may employ an alternating current (AC) generator. In such case, the power of the rechargeable battery may be applied via an AC generator driving circuit (e.g. an inverter) to allow operation as an AC motor, which can thereby provide power to the wheels of the pushable frame.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus comprising:

a frame;

a plurality of wheels attached to the frame to allow the frame to be maneuvered due to a rolling motion of the plurality of wheels;

a power generator operatively connected to the plurality of wheels via subordinate gears, the power generator generating power in response to a rotation of the plurality of wheels caused by the frame being pushed or pulled by the user;

a charging circuit which is allowed to charge a rechargeable battery;

an isolation circuit allowed to deliver the power from the power generator to a drain of a transistor within the charging circuit; and a voltage drop circuit controlling a gate bias voltage of the transistor together with a bias resistance, the voltage drop circuit adapted for manually adjusting the gate bias voltage to vary a field resistance and a current value of the transistor, so that a reduction in voltage causes the wheels to turn more easily.

2. The apparatus of claim 1, further comprising:

a deactivation switch disposed between the isolation circuit and a ground for preventing reverse movement of the wheels.

3. The apparatus of claim 1, the power generator including:

a first generator connected to a rotation shaft of a left rear wheel of the plurality of wheels; and a second generator connected to a rotation shaft of a right rear wheel of the plurality of wheels.

4. The apparatus of claim 3, wherein the first generator and the second generator are direct current generators.

* * * * *